(12) United States Patent
Morrow et al.

(10) Patent No.: US 6,211,499 B1
(45) Date of Patent: Apr. 3, 2001

(54) METHOD AND APPARATUS FOR COMPONENT SEPARATION USING MICROWAVE ENERGY

(75) Inventors: Marvin S. Morrow, Kingston; Donald E. Schechter, Ten Mile; Clyde L. Calhoun, Jr., Knoxville, all of TN (US)

(73) Assignee: BWXT Y-12 L.L.C., Oak Ridge, TN (US)

( * ) Notice: Subject to any disclaimer, the term of this patent is extended or adjusted under 35 U.S.C. 154(b) by 0 days.

(21) Appl. No.: 09/306,356

(22) Filed: May 6, 1999

(51) Int. Cl.[7] .................................................. H05B 6/64
(52) U.S. Cl. ............................................. 219/678; 134/38
(58) Field of Search ................................. 219/678, 679, 219/680, 684, 686; 134/38; 204/146; 427/286; 29/832, 840; 252/502

(56) References Cited

U.S. PATENT DOCUMENTS 3,469,053 * 9/1969 Levinson .............................. 219/679
5,268,548 * 12/1993 Kumar ................................. 219/678
5,644,837 * 7/1997 Fathi et al. ............................. 29/832
5,725,762 * 3/1998 Beal et al. ............................ 210/181

* cited by examiner

Primary Examiner—Tu Ba Hoang
(74) Attorney, Agent, or Firm—Akerman, Senterfitt & Eidson, P.A.

(57) ABSTRACT

A method for separating and recovering components includes the steps of providing at least a first component bonded to a second component by a microwave absorbent adhesive bonding material at a bonding area to form an assembly, the bonding material disposed between the components. Microwave energy is directly and selectively applied to the assembly so that substantially only the bonding material absorbs the microwave energy until the bonding material is at a debonding state. A separation force is applied while the bonding material is at the debonding state to permit disengaging and recovering the components. In addition, an apparatus for practicing the method includes holders for the components.

22 Claims, 2 Drawing Sheets

METHOD AND APPARATUS FOR COMPONENT SEPARATION USING MICROWAVE ENERGY

STATEMENT REGARDING FEDERALLY-SPONSORED RESEARCH OR DEVELOPMENT

This invention was made with government support under contract DE-AC05-84OR21400, awarded by the United States Department of Energy to Lockheed Martin Energy Systems Inc., and the United States Government has certain rights in this invention.

FIELD OF THE INVENTION

This invention relates to processes for separating joined materials. More specifically, the invention relates to a process for separating components, particularly ceramics, bonded together with adhesives.

BACKGROUND OF THE INVENTION

A method capable of separating components bonded together has been required since shortly after the first method for bonding these components together have been developed, and with each new component or bonding material, the requirements for a process capable of debonding that component/bonding material combination typically change. One relatively new type of component to be debonded is industrial ceramics which are part of a rapidly growing segment of the industrial market.

Ceramics have characteristics with regard to strength, density, and thermal properties which make them a very useful material. However, ceramics can also be very expensive because high purity material is often used in the processing of the ceramics and these materials occasionally require high-precision milling. Thus, the cost of fabricating a single ceramic component can exceed thousands of dollars. Because of the potentially high cost to manufacture, manufacturers and resellers desire to reduce manufacturing costs by recycling these components.

One of the first steps in recovering a ceramic component is to separate the ceramic component from other components attached to it. The ease in separation of these components from each other typically depends upon the type of bonding used to combine them. For example, a mechanical connection is typically easier to disassemble than an adhesive bond. However, an adhesive bond is the type of bond typically used with ceramics.

Traditionally, three general methods have been used to separate adhesively bonded components, and include applying mechanical force, chemical dissolution, and conventional heating. However, these methods each have several disadvantages associated with them. Use of mechanical force is the oldest method to separate components that are adhesively bonded. However, because the adhesive is typically designed to prevent the components from being separated by a mechanical force, the mechanical force required to separate the components can be very destructive to the components themselves. Ceramic components, in particular, are very susceptible to damage from mechanical force because ceramics in general tend to be brittle. Also, even if the components are separated intact, the force of the separation may introduce microstructural surface defects into the ceramic components, and these defects have the potential to cause the component to fail at a later time. Additionally, even if the components are separated successfully, separation by mechanical force still leaves an adhesive residue on the components. This adhesive residue often must be removed before the component can be reused. This additional step adds to the cost of recycling the components and presents another opportunity for the components to be damaged.

A second process used to debond components is to chemically dissolve the adhesive. This process involves applying a solvent so as to dissolve the adhesive. One difficulty with this process is that some portion of the adhesive may not be readily accessible to the solvent. For example, with two large flat pieces bonded together on their flat sides, the adhesive in the very middle of the bond will not be dissolved until the time-consuming process of dissolving and removing all the adhesive surrounding it is completed. Another problem associated with chemical debonding is the waste stream generated from the adhesive being chemically dissolved. This waste stream is typically considered a hazardous material, and the proper disposal of this waste steam increases the costs of the recycling process. Even costs associated with disposal of a non-hazardous waste stream negates some of the benefits associated with recycling components. Still another problem with the use of a solvent is that the solvent may attack the components as well as dissolve the adhesive. This attack on the components may degrade the usefulness of the components, and thus negate the benefit of the recycling process.

A third method of component separation is to use conventional heating. With conventional heating, the entire bonded assembly is heated to at least the temperature at which the adhesive loses its bonding properties. Once the adhesive has reached a debonding temperature, the components can be separated. One problem with this method is the length of time required to complete the process which is a result of heat transfer characteristics inherent with conventional heating.

With conventional heating, the components must first be heated, and then the components conduct that heat to the adhesive. However, ceramics in general have characteristics that make this process very inefficient. First, ceramics are typically poor conductors of heat. Thus, the heat applied to the ceramic takes a long time to reach the adhesive. Second, ceramics are typically excellent absorbers of heat. Thus, a large amount of heat is needed to raise the ceramic to the debonding temperature of the adhesive. Also, once the ceramic is heated to the debonding temperature, the ceramic requires a long time to cool when the heat is removed, which makes immediate handling of the ceramics difficult. Thus, this particular process has the disadvantage of being time consuming and energy intensive. Also, the large amount of heat applied to the components may damage the components because a long period of time at high temperature can cause detrimental microstructural changes such as grain growth.

Although microwave energy has not been used to cause an adhesive to reach a state in which the adhesive loses its bonding properties, microwave energy has been used with adhesives and to separate components. For example, U.S. Pat. No. 5,644,837 to Fathi et al. discloses applying microwave energy to cure a thermoplastic or thermosetting resin. Another example of microwave use is disclosed in U.S. Pat. No. 5,675,909 to Paré. Paré discloses a process for accelerating the separation of volatiles from liquids or solids using microwave energy. However, neither of these references address the problem of separating two components that have been combined with an adhesive.

BRIEF SUMMARY OF THE INVENTION

It is an object of the invention to provide a method and apparatus for component separation that can apply energy directly and selectively to a particular bonding area.

It is another object of the invention to provide a method and apparatus for component separation that would minimally affect the component microstructure and would not be destructive to the macrostructure.

It is yet another object of the invention to provide a method and apparatus for component separation that consumes a minimal amount of resources including time and energy.

It is a further object of the invention to provide a method and apparatus for component separation that creates no additional waste byproducts.

Another object of the invention is to provide a method and apparatus for adhesive debonding that can be used to clean adhesive from a particular component.

Still another object of the invention is to provide a method and apparatus for component separation using microwave energy that does not require tool to pull apart the components.

Yet another object of the invention is to provide a method and apparatus for component separation using heat that permits for the components to be handled after the separation of the components more readily than prior heat separation methods.

An additional object of the invention is to provide a method and apparatus for component separation using microwave energy that indicates that the adhesive material has reached a debonding state without the need for a probe to determine the temperature of the adhesive material.

These and other objects of the invention are achieved by the subject method which comprises applying microwave energy to the bonding material attaching two or more components together until the bonding material is at a debonding state, and disengaging at least one component from the remaining components. The step of determining whether the bonding material is at the debonding state before the disengaging begins can also be added. This can be accomplished in any manner and includes measuring the temperature of the bonding material or measuring the energy reflected from the bonding material to determine whether the bonding material is at the debonding state.

The components can be pulled apart or disengaged using gravity, and if so, one of the components can be cradled so that it is not damaged after being disengaged. Also, the bonding material should be pulled apart or disengaged before reaching a given temperature, if at that temperature, the bonding material returns to a bonding state. During the application of the microwave energy, the bonding materials can be exposed to a vacuum or an atmosphere such as an inert gas or air. The method is particularly effective when the components to be separated are ceramic and the bonding material is a thermoset polymer.

An additional method is disclosed for separating bonding material attached to a component which comprises applying microwave energy to the bonding material which is attached to the component until the bonding material is at a debonding state, and then removing the bonding material from the component. The bonding material should be removed before the bonding material returns to a bonding state. With certain materials, the return to a bonding state occurs when the bonding material reaches a given temperature.

Still another method is disclosed for separating a component from other components which comprises applying microwave energy to the bonding material attaching the components to each other until the bonding material is at a debonding state, disengaging at least one component apart from the other components, and the removing the bonding material from at least one of the components. If the bonding material returns to a bonding state at a given temperature, the components should be disengaged and the bonding material removed before the bonding material reaches that given temperature.

An additional embodiment of the invention is a debonding apparatus comprising a cradling fixture. The cradling fixture is adapted to support at least one component and to allow the remaining components to fall free once the bonding material reaches a debonding state. The fixture can also include a component holder or cushion for receiving the remaining components once they have fallen free. Additionally, microwave absorbers can be positioned around the fixture to absorb excess microwave energy to prevent arcing.

BRIEF DESCRIPTION OF THE DRAWINGS

There are shown in the drawings embodiments of the invention that are presently preferred, it being understood, however, that the invention is not limited to the precise arrangements and instrumentalities shown, wherein.

DETAILED DESCRIPTION OF THE INVENTION

Figure 1:
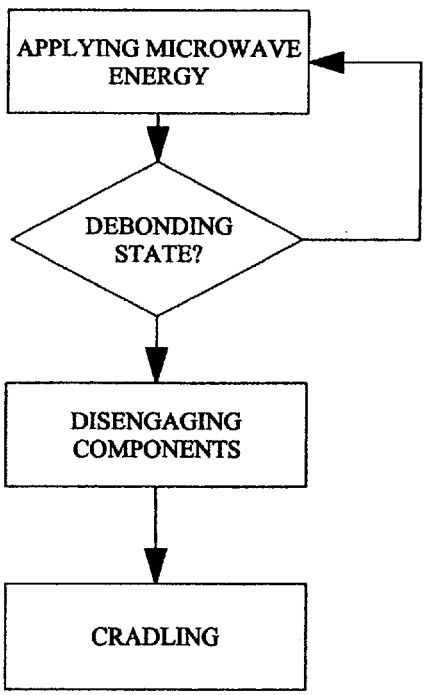
FIG. 1 is a flow diagram illustrating method steps according to a first embodiment of the invention.

Referring to FIG. 1, a method for component separation, according to the present invention, is illustrated. The method comprises applying microwave energy to a bonding area which includes bonding material used to bond together at least two components until the bonding material is at a debonding state, and disengaging at least one of the components from the remaining components before the bonding material again reaches a bonding state. A debonding state as used herein is a state wherein a bonding material loses a sufficient amount of its bonding properties for at least one of the bonded assembly components to be disengaged from the bonding material, and a bonding state is a state wherein the bonding material retains its bonding properties.

The invention is not limited as to the amount, frequency, or duration of microwave energy applied. Any combination or amount, frequency, or duration is acceptable as long as the microwave energy applied causes the bonding material to reach a debonding state. Preferably, the microwave energy is applied until the bonding material loses a sufficient amount of its bonding properties for at least one of the components to be disengaged from the bonding material without damaging the component. The microwave energy applied can be optimized depending upon certain characteristics of the separation process. These characteristics include, but are not limited to, bonding material, component material, component configuration, bonding material location, atmosphere surrounding the bonding material and/or components, method of removing one component from another, configuration of microwave chamber, and location of microwave emitters.

The amount, or power, applied by the microwave source can be fixed or variable. If variable, for example, the power output of the microwave source can ramp from a lower initial amount to a higher amount or vice-versa. Also, for example, the power output could change from one amount to a second amount, hold steady at the second amount for a period of time, and then change again.

Although the invention is not limited as to the amount of microwave power applied, the presently preferred power range is between about 0.5 and 12.0 kilowatts. However, arcing may occur within the chamber depending upon the amount of the power applied relative to the combined absorption rate of any materials within the chamber capable of absorbing the microwave energy. Arcing can be undesirable because arcing may damage either the microwave source itself and/or the components within the microwave chamber.

Microwave absorbers can be introduced into the chamber to absorb excess microwave energy so as to prevent arcing. Many types of materials can absorb microwaves and all are acceptable for this purpose. The presently preferred material for the microwave absorber is ceramic. The total volume of the microwave absorbers needed to prevent arcing depends upon the excess microwave energy to be absorbed and the absorbing characteristics of the material used.

Microwave absorbers can also be used as sources of energy to raise the temperature of the bonding material. The microwave absorption characteristics of some materials change depending upon the temperature of the material. As such, if the bonding material does not readily absorb microwave energy at the temperature at which it is placed into the microwave oven, the microwave absorbers can be used to transfer energy to the bonding material to raise the temperature of the bonding material so as to increase the microwave absorption characteristics of the bonding material. Once the increase in temperature increases the microwave absorption characteristic, the bonding material can more readily directly absorb the microwave energy.

The frequency of the microwave energy applied can either be fixed or variable and is not limited as to a particular frequency or frequency range. Although the microwave energy can be applied with frequencies of up to about 28–32 GHz and higher, a lower frequency, such as about 2.45 GHz, is presently preferred. Although most commercial microwave sources are limited to 15 Mhz, the invention is not so limited. Any frequency that causes the bonding material to reach a debonding state is acceptable.

A higher frequency microwave energy is likely to couple more in with the surface of the component, whereas microwave energy at a lower frequency is more likely to couple with the interior of the component. Coupling with the component where the bonding material is located advantageously causes more energy to be applied to the bonding material.

The manner of application of microwave energy applied to the components and bonding material can be either continuous or intermittent. So long as sufficient microwave energy is applied such that the bonding material reaches a debonding state, any duration of microwave energy is acceptable. The presently preferred duration of microwave energy is continuous. This decreases the time the components and bonding material must spend in the microwave chamber. Depending upon the above-mentioned variables, the current process is able to bring the bonding material to a debonding state in about 15–30 minutes in many applications. In contrast, similar components debonded using conventional heating can take between several hours and a day before the bonding material reached a debonding state.

This method is not limited as to the type of bonding material that bonds the components together. However, this method is particularly effective with bonding materials that reach a debonding state after exposure to microwave energy. For example, the microwave energy may affect the physical or chemical bonds in the bonding material such that the bonding material loses some or all of its bonding properties. An example of which is where the bonding material changes phase from a solid to a softened or liquid state after the microwave energy raises the bonding material to a certain temperature. The bonding material, being in a fluid phase, typically has diminished bonding properties than of the same bonding material in a solid phase. One example of such a bonding material is a thermoset polymer. One example of a bonding material in which the chemical bonds are affected is epoxy.

Although the bonding material is not limited as to composition, the claimed invention is especially effective for debonding bonding materials which readily absorb microwave energy. As the bonding material absorbs more microwave energy, the bonding material will be more likely to reach a debonding state more rapidly. One bonding material which has been effectively debonded with the invention is a thermoset polymer, such as poly-urethane, having a debonding state that occurs after the polymer reaches a temperature of 250° C.

When the debonding temperature of a particular bonding material is known, for example as with a thermoset polymer, the process of separating components may include an additional step of determining the temperature of the bonding material. By measuring the temperature of the bonding material and thereby whether the bonding material has reached a debonding state, a determination can be made as to whether and when the components can be disengaged. Any manner of measuring the temperature of the bonding material is acceptable. Examples include use of a thermocouple or an optical thermometer. However, the temperature of the bonding material may not be easily measured because the bonding material is positioned so that a temperature measuring device cannot access the bonding material. As such, the temperature of the bonding material may have to be approximated from the temperature of the components adjacent the bonding material.

Another method, besides measuring temperature, of determining whether the bonding material has reached a debonding state is by measuring the amount of reflected power within the microwave chamber. Because certain bonding materials absorb different amounts of microwave energy at a bonding state than at a debonding state, a change in the amount of reflected power within the microwave chamber can indicate that a debonding state of the bonding material has been reached. Advantageously, this enables the bonding state to be determined without the need of intrusive probes that could damage the components. Notwithstanding this particular method, any method of determining whether the bonding material has reached a debonding state is acceptable for use with this invention.

Components that are made of many types of material can be separated using this process and can include, but are not limited to, ceramics, metals, and composites. Preferably, the material can be any non-metallic, non-organic crystalline structure. However, this process is particularly effective with materials that are to some degree transparent to microwave energy such that the microwave energy can pass through the material. Materials that are transparent to microwave energy advantageously allow the microwave energy to reach the bonding material. As such, at least one of the components is preferably somewhat transparent to microwave energy.

Components that are transparent to microwaves do not readily absorb microwave energy. A component made from a material that absorbs little microwave energy is less likely to be damaged during the separation process. Also, because less microwave energy will be absorbed by the component, more microwave energy will be absorbed by the bonding material. Thus, the process will advantageously be more efficient as to the amount of microwave energy used and as to the amount of time needed to reach a debonding state of the bonding material. Also, because the component has absorbed little of the microwave energy, the component will only be at a slightly elevated temperature compared to its initial temperature and thus can be handled more immediately and more easily.

Although this method can be used with metallic components, a metallic component has properties that can reduce the effectiveness of the process. For example, because metallic components tend to act as a shield against microwave energy, if the bonding material is positioned so as to be completely surrounded by metal, the microwave energy may not be able to penetrate to the bonding material. Thus, the presently preferred configuration of processing metallic components is to orient the metallic components relative to each other so that the microwave energy is not prevented from penetrating the bonding material.

Components that are susceptible to damage from microwave energy can still be separated using this process if these components can be protected from damage. One means of protecting a component from damage is to change the amount and/or frequency of the microwave energy being directed at the component. Different materials can be more susceptible to damage at certain power/frequency settings than at other settings. Thus, a component can be protected by using a less damaging power and/or frequency setting. Also, a component can be protected by having the portion of the component susceptible to damage shielded from the microwave energy. Methods and devices for shielding a component or portion of a component against microwave energy are well known and any of these can be used with this process. One example of such a shield is a metal foil surrounding the susceptible portion.

Many processes and/or tools can be used in the step of pulling apart or disengaging one component from another. Examples of methods for disengaging components from each other include: grasping and pulling at least one of the components with a tool; applying different forces to different components; or allowing gravity to pull one component from another. These examples are illustrative and typical, but are not to be considered exhaustive or limiting. The presently preferred step of disengaging one component from another is to allow gravity to pull apart the components. Advantageously, using gravity to pull apart the components does not require the use of any additional equipment to pull the components apart. Also, in situations in which one or more of the components are contaminated, using gravity to pull apart the components advantageously requires less handling of the contaminated components. Still another advantage of using gravity to pull apart the components is that a determination of the bonding state of the bonding material, typically as a function of temperature, is not necessary before the disengaging step takes place. Because gravity is always pulling on the component to be disengaged, the component will disengage once the bonding material reaches a debonding state.

The method for component separation can also include a step whereby the component to be removed is cradled during the removal process. For example, where a first component is to be removed from a second component by using the force of gravity on the second component to cause the second component to fall, the components can be cradled using a cradling fixture. The cradling fixture catches or retains the second component to prevent damage to the second component.

Figure 2:
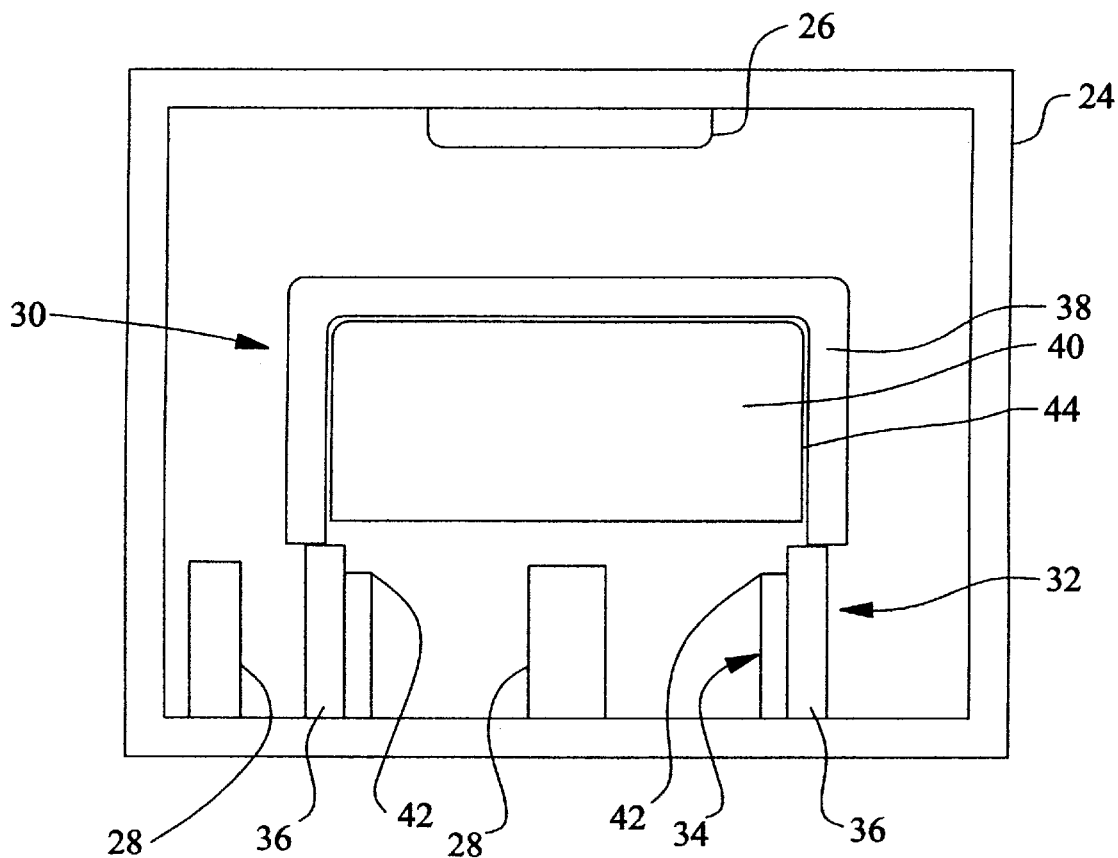
FIG. 2 is a side view of a cradling fixture and microwave chamber.

Any cradling fixture that prevents damage to a component after separation is acceptable for use with this invention. The presently preferred cradling fixture 30 is illustrated in FIG. 2. The cradling fixture 30 is preferably positioned within a chamber 24 having a microwave emitter 26. The cradling fixture 30 preferably comprises two component holders 32, 34 for holding the components 38, 40. Although the cradling fixture 30 is not limited as to the type of component holders 32, 34, the presently preferred first component holder 32 is a first pair of rails 36 he upon which a first component 38 rests. The second component 40 is attached to and suspended from the first component 38 such that the second component 40 is supported by the first component 38. Also included is a second component holder 34 which comprises a cushion 42 positioned slightly below the second component 40. Any type of cushion 42 capable of cushioning the component 40 is acceptable; however, the preferred cushion 42 would not readily absorb microwave energy. The presently preferred cushion 42 includes ceramic fiber. The cradling fixture 30 can also include the aforementioned microwave absorbers 28 for absorbing excess microwave energy.

After the bonding material 44 has reached the debonding state, the force of gravity upon the second component 40 will force the second component 40 away from the first component 38. Once the second component 40 begins to move away from the first component 38, the second component holder 34 receiving the second component 40. This cradling prevents the second component 40 from be damaged after the second component 40 eventually comes to rest.

The components can be exposed to a controlled atmosphere during the separation process, for example to prevent oxidization. Many atmospheres are acceptable to prevent oxidization or other damage when desired. An inert atmosphere, for example argon or nitrogen, can be advantageously used when the bonding material is raised to such a temperature that oxidization occurs. A dry atmosphere may also be advantageously used to prevent degradation of the component when the component is moisture sensitive. Also, air can included as a controlled atmosphere if the characteristics of the air, for example humidity and temperature, are controlled for any reason. Alternatively, a vacuum can be used to keep oxygen, moisture, or the like from the microwave chamber and thereby protect the bonding material and/or components. Vacuum as used herein applies to partial vacuum conditions as well as essentially total vacuum.

The method of component separation often does not require any pre-microwave preparation of the components and/or bonding materials. However, those components that have portions that may be damaged by the microwave energy or may damage the microwave chamber itself, for example because of arcing, may be removed prior to applying the microwave energy to the components. Also, as previously discussed, certain portions of the components may be shielded prior to the application of microwave energy.

Figure 3:
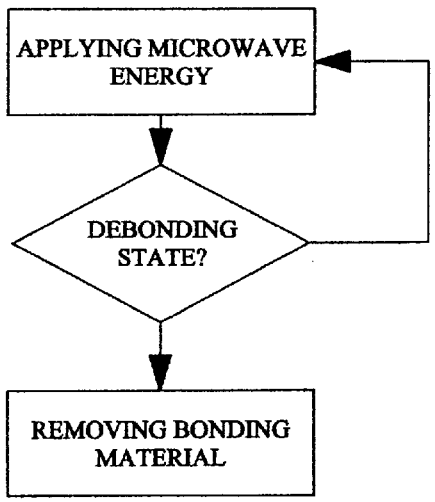
FIG. 3 is a flow diagram illustrating method steps according to a second embodiment of the invention.

Referring to FIG. 3, a method for removing bonding material from at least one component is illustrated. The method comprises applying microwave energy to the bonding material attached to the component until the bonding material is at a debonding state, and removing the bonding material from the at least one component before the bonding material turns to the bonding state. This method can be performed in addition to the method illustrated in FIG. 1, or optionally, this method can be performed separate from the method illustrated in FIG. 3.

Figure 4:
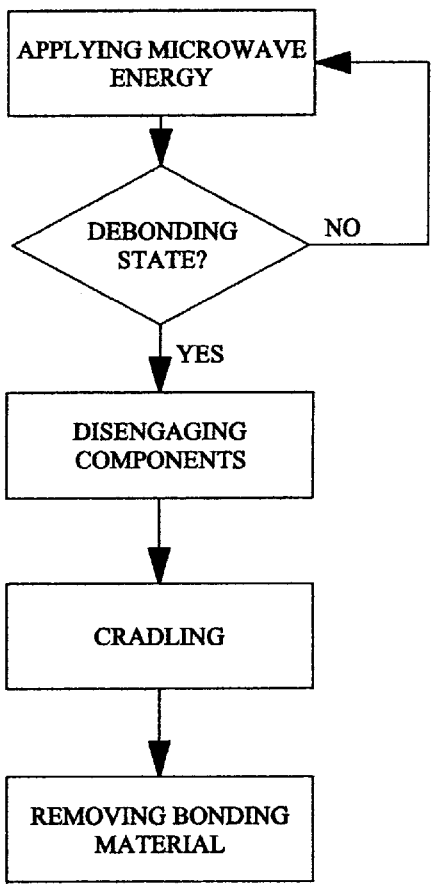
FIG. 4 is a flow diagram illustrating method steps according to a third embodiment of the invention.

FIG. 4 illustrates the combination of the methods of FIG. 1 and FIG. 3, and the combined method would comprise applying microwave energy to bonding material attached to components until the bonding material is at a debonding state, disengaging at least one of the components from the remaining components before the bonding material reaches a bonding state, and removing the bonding material from at least one component before the bonding material returns to the bonding state.

These additional methods are subject to the same limitations of the limitations placed on the first method disclosed. Additionally, those processes capable of removing the bonding material from the components to which the bonding material is attached are acceptable for use with this invention. For example, one process of removing bonding material is to physically scrape the bonding material from the components. Another process of removing bonding material is to continue applying microwave energy until the bonding material no longer bonds to the components and either falls off or flakes off. These processes are intended to illustrate possible methods of removing the bonding material and are not intended to be limiting.

It should be understood that the examples and embodiments described herein are for illustrative purposes only and that various modifications or changes in light thereof will be suggested to persons skilled in the art and are to be included within the spirit and purview of this application.

The invention can take other specific forms without departing from the spirit or essential attributes thereof for an indication of the scope of the invention.

What is claimed is:

1. A method for separating and recovering components, comprising the steps of:
   providing at least a first component bonded to a second component by a microwave absorbent adhesive bonding material at a bonding area to form an assembly, said bonding material disposed between said components;
   directly and selectively applying microwave energy to said assembly so that substantially only said bonding material absorbs said microwave energy until said bonding material is at a debonding state, whereby said bonding material loses its bonding properties sufficient to permit separation of said components and the microstructure of said components is minimally affected to prevent destruction of said components; and,
   applying a separation force while said bonding material is at said debonding state to permit disengaging and recovering said second component from said first component.

2. A method for separating and recovering components according to claim 1, further comprising an initial step of positioning said second component relative to said first component whereby after said bonding material is at a debonding state, said second component disengages from said first component under the force of gravity.

3. A method for separating and recovering components according to claim 2, further comprising the step of cradling said second component after said disengaging step.

4. A method for separating and recovering components according to claim 1, wherein the step of applying microwave energy is accomplished while simultaneously exposing said bonding material to a controlled atmosphere around the assembly.

5. A method for separating and recovering components according to claim 4, wherein the controlled atmosphere comprises an inert gas.

6. A method separating and recovering components according to claim 4, wherein the controlled atmosphere comprises air.

7. A method separating and recovering components according to claim 4, wherein the controlled atmosphere comprises a vacuum.

8. A method for separating and recovering components according to claim 1, wherein said components are ceramic.

9. A method for separating and recovering components according to claim 1, wherein said bonding material is thermoset polymer.

10. A method for separating and recovering components according to claim 1, further comprising the step of determining that said bonding material is at said debonding state before said disengaging step.

11. A method for separating and recovering components according to claim 10, wherein said step of determining that said bonding material is at said debonding state is accomplished by measuring the temperature of said bonding material.

12. A method for separating and recovering components according to claim 10, wherein said step of determining that said bonding material is at said debonding state is accomplished by measuring the energy reflected from said bonding material.

13. A method for separating and recovering components according to claim 1, wherein at least one of said components is substantially transparent to said microwave energy.

14. A method for separating and recovering components according to claim 1, further comprising an initial step of selecting a frequency of the microwave energy whereby the microwave energy couples with said bonding material.

15. A method for separating bonding material attached to a bonding area of a component from the component, comprising the steps of:
   directly and selectively applying microwave energy to said component so that substantially only said bonding material absorbs said microwave energy until said bonding material is at a debonding state, whereby said bonding material loses its bonding properties and the microstructure of the component is minimally affected to prevent destruction to the component; and,
   removing said bonding material from said component.

16. A method for separating bonding material according to claim 15, wherein said step of removing said bonding material is accomplished before said bonding material returns to a bonding state.

17. A method for separating and recovering components, comprising the steps of:
   providing at least a first component bonded to a second component by a microwave absorbent adhesive bonding material at a bonding area to form an assembly, said bonding material disposed between said components;
   directly and selectively applying microwave energy to said assembly so that substantially only said bonding material absorbs said microwave energy until said bonding material is at a debonding state, whereby said bonding material loses its bonding properties sufficient to permit separation of said components and the microstructure of said components is minimally affected to prevent destruction of said components;
   applying a separation force while said bonding material is, at said debonding state to permit disengaging and recovering at least said second component from said first component; and removing said bonding material from at least one of said components.

18. A method for separating and recovering components according to claim 17, wherein said step of removing said bonding material and said step of disengaging are accomplished before said bonding material returns to a bonding state.

19. A cradling fixture for supporting components to be debonded using microwave energy, said components being attached together with a bonding material constituting an assembly, comprising:

a first component holder for supporting at least a first of the components; and, a second component holder for receiving at least a second of the components, whereby at least the second of the components is supported by at least the first of the components, and after directly and selectively applying microwave energy to said assembly so that substantially only said bonding material absorbs said microwave energy until the bonding material reaches a debonding state, whereby said bonding material loses its bonding properties sufficient to permit separation by application of a separation force while said bonding material is at said debonding state of said components and the microstructure of said components is minimally affected to prevent destruction of said components so that at least the second of the components falls free to be received by said second component holder.

20. A cradling fixture according to claim 19, further comprising microwave absorbers for absorbing microwave energy.

21. A cradling fixture according to claim 19, wherein said second component holder further comprises a cushion.

22. A cradling fixture according to claim 21, wherein said cushion comprises ceramic fibers.

* * * * *